United States Patent

Kuder et al.

Patent Number: 5,222,180
Date of Patent: Jun. 22, 1993

[54] POLYMER OPTICAL FIBRE BUNDLE AND METHOD OF MAKING SAME

[75] Inventors: James E. Kuder, Fanwood; Douglas P. Karim, Greenbrook; Martin Schorning, Summit, all of N.J.

[73] Assignee: Hoechst Celanese Corp., Somerville, N.J.

[21] Appl. No.: 968,092

[22] Filed: Oct. 29, 1992

[51] Int. Cl.⁵ .............................................. G02B 6/04
[52] U.S. Cl. ................................... 385/115; 385/116; 385/146; 65/3.11
[58] Field of Search ................ 385/115, 116, 146, 31; 65/3.11, 4.2

[56] References Cited

U.S. PATENT DOCUMENTS

| | | | |
|---|---|---|---|
| 3,902,880 | 9/1975 | Strack | 385/115 |
| 3,912,362 | 10/1975 | Hudson | 385/115 |
| 4,360,372 | 11/1982 | Maciejko | 385/115 |
| 4,743,082 | 5/1988 | Mori | 385/115 |
| 4,758,064 | 7/1988 | Neefe | 385/115 |
| 4,759,604 | 7/1988 | Utsumi et al. | 385/116 |
| 4,812,012 | 3/1989 | Terada et al. | 385/115 |
| 4,923,268 | 5/1990 | Xu | 385/50 |
| 4,988,162 | 1/1991 | Hayami | 385/116 |

Primary Examiner—Frank Gonzalez
Attorney, Agent, or Firm—Michael W. Ferrell

[57] ABSTRACT

An optical fiber bundle 10 is disclosed including a plurality of polymer optical fibers 12 disposed within a rigid sleeve 14. The fibers have been drawn to a draw ratio of at least 1:1.5 prior to placing them within the sleeve, whereupon the structure 13 is heated to induce elastic relaxation of the fibers which contract in length and expand in girth. The expansion within the rigid sleeve results in a close-packed geometry.

20 Claims, 2 Drawing Sheets

FIG. 1
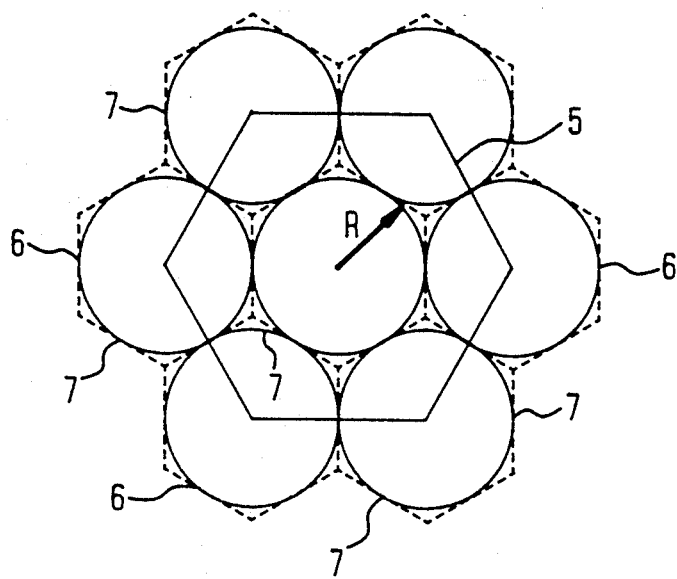
FIG. 2
FIG. 2A
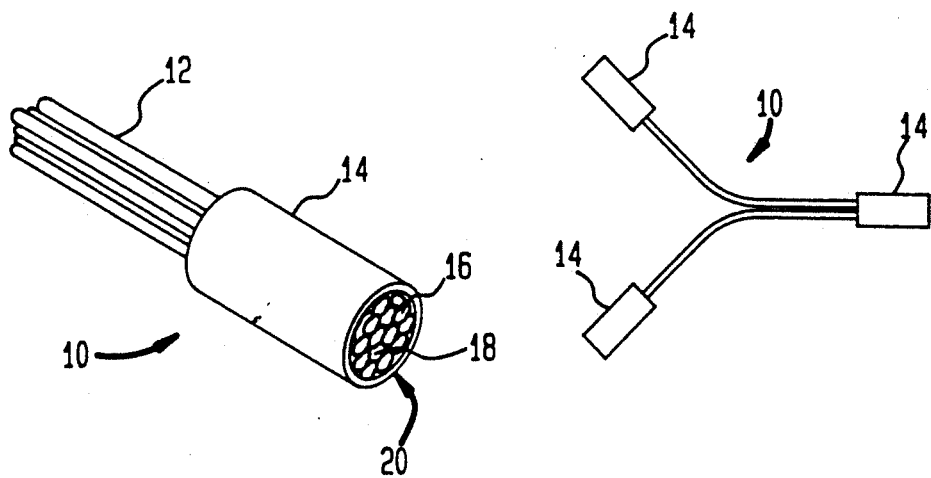

FIG. 3
FIG. 3A
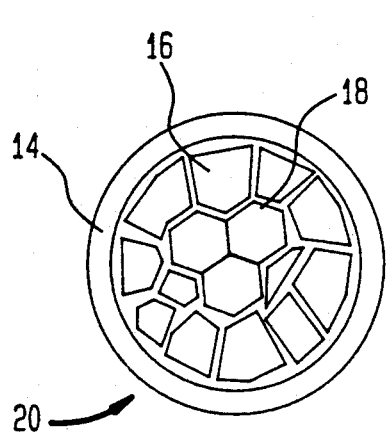
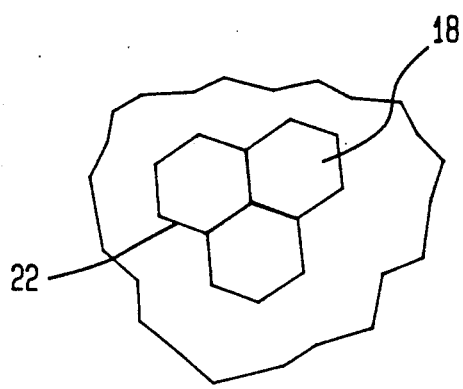
FIG. 3B
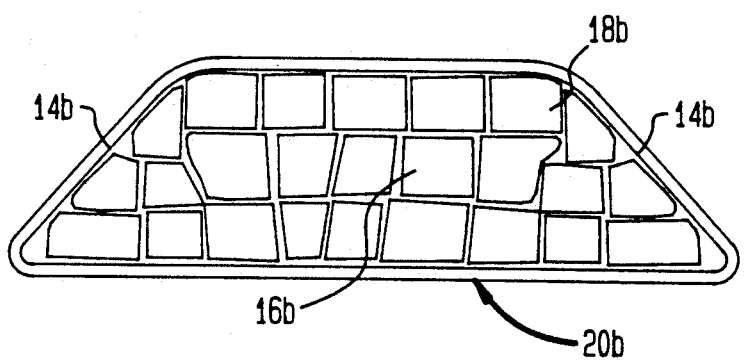
FIG. 4
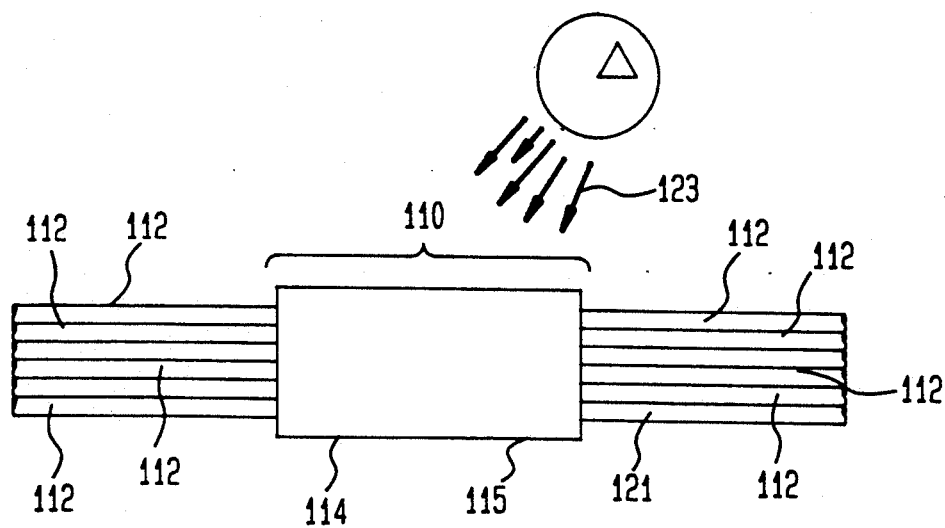

POLYMER OPTICAL FIBRE BUNDLE AND METHOD OF MAKING SAME

TECHNICAL FIELD

The present invention relates generally to optical fiber bundles and more particularly to polymer fiber optic bundles suitable for illumination and display applications.

BACKGROUND OF INVENTION

It is known to fabricate articles including a bundle of polymer optical fibers, for example, as disclosed in U.S. Pat. No. 4,923,268 to Xu. In the '268 patent there is shown and claimed a passive star coupler formed by placing a bundle of polymer optical fibers within a sleeve of shrink tube and melt-fusing the bundle so that an optical signal incident on one or more fibers in the bundle is distributed to all the fibers therein. The shrink tube employed by Xu is made of Teflon ® fluoropolymer having a softening point approximating that of the fibers being melt-fused. Star coupler fabrication by this method involves removing the cladding layer of a polymer optical fiber which leads to undesirable optical signal attenuation.

It is typically desirable to include in illumination and display applications a light conducting element of about ⅛ a centimeter (¼") or more in diameter. Monolithic devices are typically employed; however, such elements tend to be rigid and accordingly unsuitable for uses where flexibility is needed. Unlike optical star coupling applications, signal mixing is not required in illumination bundles and indeed, removal of cladding is to be avoided in order to reduce optical losses.

SUMMARY OF INVENTION

It has been found that polymer optical fiber bundles are particularly suitable for illumination applications where flexibility and high optical throughput is required. This is especially true in the case of multi-mode polymer optical fiber with thin cladding layers which have a much larger volumetric core component than glass optical fibers.

A typical optical fiber bundle produced in accordance with the present invention includes a plurality of polymer optical fibers which have been drawn in a ratio of from about 1:1.5 to about 1:3 disposed within a rigid sleeve. During fabrication, the fibers are heat treated to relax their internal stress such that they longitudinally contract and radially expand to fill the sleeve and conform their geometry to a close-packing arrangement. It is important that the sleeve maintain its dimensions during fabrication so that the desired close-packing geometry among fibers is achieved. In a preferred embodiment, the bundle includes optical fibers with a poly(methylmethacrylate) core and a rigid polymer sleeve made of semi-crystalline polymer resin.

BRIEF DESCRIPTION OF DRAWINGS

The invention is described in detail below with reference to the various figures wherein like numerals designate similar parts and in which:

FIG. 1 is a diagram illustrating advantages of the present invention;

FIG. 2 is a perspective view of one end of a bundle of optical fibers fabricated in accordance with the present invention;

FIG. 2A is a top view of a 3-port illumination bundle configured in accordance with the present invention;

FIG. 3 is a view in elevation of the end of the bundle of FIG. 1;

FIG. 3A is a detail of FIG. 3;

FIG. 3B depicts an alternate cross section of a fiber bundle; and

FIG. 4 is a schematic diagram illustrating fabrication of the inventive articles.

DETAILED DESCRIPTION

The invention is described hereinafter with reference to several embodiments which are provided for purposes of illustration only. It will readily be appreciated by one of skill in the art that numerous geometries and material combinations other then those specifically illustrated may be suitable for use within the spirit and scope of the present invention which is defined by the appended claims.

A prominent feature of the present invention is the ability of the inventive fiber optic bundles to efficiently collect and transmit light from a single source. For example, if a circular source had a radius of 3R, an ensemble of 7 cylindrical fibers having a radius R of suitable dimensions would have an area "mismatch" due to the interstitial voids between fibers. The optical loss due to the area mismatch in the case of circular cross section is:

$$-10 \log \left( \frac{7\pi R^2}{\pi (3R)^2} \right) \tag{1}$$

or about 1.1 dB. In other words, about 22% of light available from the source is not collected at all.

Alternatively, one could compare areas within, a hexagonal repeat unit 5 as shown in FIG. 1 to appreciate surface area differentials due to shape of fiber cross section. A series of circles 6 of radius R are shown in solid lines as well as a series of hexagons 7 in dotted lines. The area of the circles within repeat unit 5 is that of one complete circle plus ⅓ the area of six other circles or $$(1+6/3)\pi R^2 \tag{2}$$

On the other hand, the area of hexagons falling within repeat unit 5 is that of 1 complete hexagon plus ⅓ the area of 6 hexagons all which have inscribed circles of radius R or in other words.

$$(6+\tfrac{1}{3} 6.6)R^2 \tan 30° \tag{3}$$

$$=6\sqrt{3}R^2 \tag{4}$$

The ratio of available surface area by this method is thus:

$$\frac{\text{Area Hexagons}}{\text{Area of Circles}} = \frac{6\sqrt{3}}{3\pi} = 1.10 \tag{5}$$

This latter analysis is believed more consistent with the transmissive properties of articles produced in accordance with the present invention.

Turning to FIG. 2, there is shown a fiber bundle 10 including a plurality 12 of polymer optical fibers disposed within a sleeve 14. The polymer optical fibers may be made from a variety of polymer optical fibers; polymers such as polyacrylates, polycarbonates, aromatic copolyesters including the residue of bisphenol A and polystyrenes generally being considered the most suitable. Poly(methylmethacrylate) fibers are perhaps the most preferred polymers.

The polymer optical fibers utilized in accordance with the present invention must be drawn to a ratio of at least about 1:1.5. A draw ratio of about 1:1.5 to about 1:5 is generally suitable; however, draw ratios of from about 1:1.5 to about 1:3 are believed most preferred. As used herein, the term "draw ratio" refers to heat-stretching after extrusion, a draw ratio of 1:2, for example, refers to a fiber that has been stretched 100% after being extruded and quenched. Typically, drawing is carried out at a slightly higher temperature (10°–50° C.) higher than the glass transition temperature of the polymer. As one of skill in the art will appreciate, such drawn fibers have an elastic memory that will relax upon re-heating to relieve inherent mechanical stress along the longitudinal axis. Thus, the fiber will shrink in length and expand in girth upon heating without applied tension.

Sleeve 14 may be made of any suitably rigid material such as a metal or polymeric resin so long as the sleeve has a softening point at least about 10° C. higher than optical fibers 12. A softening point at least 25° C. higher than the softening point of the fibers is preferred, 50° C. higher being even more preferred. Copper or aluminum and semi-crystalline or other high softening temperature resins such as polyamides, polyesters, polyacetals, polysulfones, polyurethanes and the like are particularly preferred. Metal may have advantages for uniform heat distribution. The sleeve may be shaped (e.g. threaded) on the outside for convenient connection to housing of a light source, if so desired.

Fibers 12 initially have a uniform circular cross section along their length; however, upon fabrication, their ends 16, 18, conform to the available cross section of sleeve 14 as will be described further below.

The invention fiber bundles 10 of the present invention can be made as a simple 2-port cable, or, if so desired may be made with one input port and 2 output ports as shown in FIG. 2a. Other multiport geometries may also be configured.

In FIG. 3, there is shown a view in elevation of an end 20 of a fiber bundle constructed in accordance with the present invention. It may be seen that at their ends 16, 18 the fibers, which were initially cylindrical, conformed their cross sectional shape to the available cross section within sleeve 14. As shown in FIG. 3a, many of the intially cylindrical fibers have a hexagonal shape 22 at their ends when fabrication is complete.

A variety of shapes may be used in connection with the present invention, especially with respect to rigid sleeve 14. In this connection, there is shown in FIG. 3b a trapezoidal sleeve 14b giving rise to a trapezoidal end 20b having fibers with squarish ends 16b, 18b.

Fabrication of the inventive fiber bundles is illustrated in connection with FIG. 4 where there is shown a polymer sleeve 114 disposed about a plurality of coaxially aligned, parallel polymer optical fibers 112. Alternatively, the sleeve could be made of copper which is polished to remove burrs so that it is smooth. Fibers 112 are of the poly(methylmethacrylate) core/-fluoropolymer clad type such as is available from Hoechst Celanese Corporation. These fibers are typically drawn to a ratio of about 1:2. Initially fibers 112 are circular in cross section. At the outset, about thirty (30) of these fibers are threaded through cylindrical sleeve 114 which has an inside diameter typically of about one quarter inch (¼") or smaller than about one centimeter, e.g., 0.6 cm, to protrude about one inch (1") at 121. The sleeve, which is made of nylon polyamide is heated with a hot air gun indicated at 123. Of course, any heat source such as an electrically resistive heating ring could be used or IR light source. The temperature of the hot air gun is set at about 280–300 degrees Centigrade (280°–300° C.) and bundle 110 is heated for 10–20 minutes so that the components 112, 114 reach a temperature of about 115° C. or about 240° F. This is sufficient temperature to induce the fibers to shrink in length and radially expand at region 110 so that the fibers 112 expand to the available cross section within sleeve 114. Sleeve 114 is then cut with a diamond wheel at 115 and polished with a standard series of fiber polishing grits. The same may be accomplished with suitable "heat-polish" equipment, e.g., a hot glass plate pressed on the end of bundle. Alternately, the sleeve can be cut with resistive heating wire. Polishing can also be accomplished by pressing against a mirror surface hot plate. The cross section exhibits the hexagonal cross sectional geometry shown in FIG. 3, with a substantial absence of voids between fibers in the final product.

It should be noted during the foregoing process that the temperature of the bundle was kept well below the softening point of sleeve 114 which remained rigid.

If the softening temperature of the sleeve were exceeded, such as would be the case with a shrink-tube fluoropolymer sleeve at the above temperatures, the sleeve expands non-uniformly causing shoulders where microbend losses occur in the final product and there are voids due to sleeve deformation. Both of such conditions are undesirable.

With poly(methylmethacrylate) fibers, it is possible to heat the bundle to well above 100° C. under suitable conditions perhaps to 125° C. or even 150° C. Such temperatures may be employed advantageously with a high melting point polycarbonate, for example.

Fiber bundles with the close-packed geometry at twin ends in accordance with the present invention typically exhibit a 10% superior transmission efficiency than bundles without the close-packed geometry at their ends.

As will readily be appreciated by one of skill in the art, it is preferable to employ fibers with an acceptance angle greater than the angular size of the light source. A source with an angular size incident on the input face of the fiber bundle about ten percent (10%) smaller than the acceptance angle of the fiber is preferred.

We claim:

1. An optical fiber bundle including polymer optical fibers comprising in combination a plurality of polymer optical fibers which have been drawn with a draw ratio of at least about 1:1.5 such that said plurality of fibers possess inherent mechanical stress along their longitudinal axes and a rigid sleeve member disposed about said plurality of fibers, said sleeve member having a softening temperature at least about 10° C. higher than the softening temperature of said polymer optical fibers and wherein said fibers have been heat-treated within said sleeve to induce axial compression and radial expansion such that the fibers cooperate with the rigid sleeve member to conform to the available cross section defined thereby.

2. The optical fiber bundle according to claim 1, wherein said sleeve member has a softening temperature at least about 25° C. higher then the softening temperature of said polymer optical fiber.

3. The optical fiber bundle according to claim 1, wherein said sleeve member has a softening temperature at least about 50° C. higher than the softening temperature of said polymer optical fiber.

4. The optical fiber bundle according to claim 1, wherein said rigid sleeve member comprises a metal.

5. The optical fiber bundle according to claim 4, wherein said rigid sleeve member is formed of copper or aluminum.

6. The optical fiber bundle according to claim 1, wherein said rigid sleeve member comprises a polymer resin.

7. The optical fiber bundle according to claim 6, wherein said polymer resin is a resin selected from the group consisting of polyamides, polyesters, polyacetals, polysulfones and polyurethanes.

8. The optical fiber bundle according to claim 1, wherein said polymer optical fibers have been drawn with a draw ratio of about 1:1.5 to about 1:5.

9. The optical fiber bundle according to claim 5, wherein said optical fibers have been drawn with a draw ratio of from about 1:1.5 to about 1:3.

10. The optical fiber bundle according to claim 1, wherein said polymer optical fibers comprise a polymer selected from the group consisting of polycarbonates, polyacrylates, polyester copolymers of aromatic diacids and bisphenol A, and polystyrenes.

11. The optical fiber bundle according to claim 10, wherein said polymer optical fibers are formed of poly(methylmethacrylate).

12. A method of making an illumination bundle of polymer optical fibers comprising in combination:
(a) disposing a plurality of thermoplastic polymer optical fibers within a rigid sleeve member, said sleeve member having a softening point at least about 10° C. higher than the softening point of said polymer optical fibers and wherein said polymer optical fibers have been drawn at a draw ratio of at least about 1:1.5 to produce a first fiber optic bundle;
(b) heat treating said first fiber optic bundle with temperature and for a time sufficient to induce relaxation of the draw stress inherent in said polymer optical fibers wherein said first fiber optic bundle is configured and dimensioned so that said polymer optical fibers cooperate with said sleeve member to conform to the available free cross sectional area defined thereby to produce a second fiber optical bundle wherein the fraction of cross section occupied by said polymer optical fibers within said sleeve is higher than the corresponding fraction of said first fiber optic bundle.

13. The method according to claim 12, wherein the softening temperature of said rigid sleeve is at least about 25° C. higher than the softening temperature of said polymer optical fibers.

14. The method according to claim 12, wherein the softening temperature of said rigid sleeve is at least about 50° C. higher than the softening temperature of said polymer optical fibers.

15. The method according to claim 12, wherein said first fiber optic bundle is heat-treated at a temperature of at least about 100° C.

16. The method according to claim 12, wherein said first fiber optic bundle is heat treated at a temperature of at least about 125° C.

17. The method according to claim 13, wherein said first fiber optic bundle is heat treated at a temperature of at least about 150° C.

18. The method according to claim 12, wherein said fibers have been drawn to a draw ratio from about 1:1.5 to about 1:3.

19. The method according to claim 12, whrein said rigid sleeve comprises a metal.

20. The method according to claim 12, wherein said rigid sleeve comprises a semi-crystalline polymeric resin.

* * * * *